(12) United States Patent
Gorin

(10) Patent No.: US 6,819,798 B2
(45) Date of Patent: Nov. 16, 2004

(54) SPECTRAL DRIFT AND CORRECTION TECHNIQUE FOR HYPERSPECTRAL IMAGING SYSTEMS

(75) Inventor: Brian A. Gorin, Setauket, NY (US)

(73) Assignee: BAE Systems Information Electronic Systems Integration Inc., Syosset, NY (US)

(*) Notice: Subject to any disclaimer, the term of this patent is extended or adjusted under 35 U.S.C. 154(b) by 683 days.

(21) Appl. No.: 09/912,549

(22) Filed: Jul. 26, 2001

(65) Prior Publication Data

US 2002/0015151 A1 Feb. 7, 2002

Related U.S. Application Data

(60) Provisional application No. 60/221,270, filed on Jul. 27, 2000.

(51) Int. Cl.[7] .................................................. G06K 9/46
(52) U.S. Cl. ....................... 382/207; 382/191; 382/260; 250/316.1; 250/339.09; 73/23.37
(58) Field of Search ................................. 382/207, 191, 382/210, 260, 305, 2; 702/22, 27, 134; 250/316.1, 339.08, 339.07, 339.11, 339.12, 339.13, 339.14, 338.1, 339.01; 73/23.37

(56) References Cited

U.S. PATENT DOCUMENTS

| | | | |
|---|---|---|---|
| 4,873,481 A | 10/1989 | Nelson et al. | 324/58.5 R |
| 5,424,543 A | 6/1995 | Dombrowski et al. | 250/330 |
| 5,602,394 A | 2/1997 | Dombrowski et al. | 250/339.02 |
| 5,822,222 A | 10/1998 | Kaplinsky et al. | 364/557 |
| 6,008,492 A * | 12/1999 | Slater et al. | 250/334 |
| 6,180,990 B1 | 1/2001 | Claiborne et al. | 257/440 |
| 6,341,257 B1 * | 1/2002 | Haaland | 702/27 |

OTHER PUBLICATIONS

"Infrared Transmission Wavelength Standard", SRM Catalog [online]. National Institute of Standards & Technology Certificate, [Retrieved Dec. 9, 1999]. Retrieved from the Internet: <URL: http://ois.nist.gov/srmcatalog/certificates/view_cert2.cfm?certificate+1921a>, 7 pages.

Simonds, J.A. et al., "Internal Diagnostics for FT–IR Spectrometry", *SPIE*, vol. 3082, pp. 106–120.

Zhu, C. and Hanssen, L.M., "Absorption Line Evaluation Methods for Wavelength Standards", *SPIE Conference on Optical Diagnostic Methods for Inorganic Transmissive Materials*, San Diego, California, Jul. 1998, SPIE, vol. 3425, pp. 112–118.

Copy of International Search Report issued Apr. 10, 2002 for Appln. No. PCT/US01/23418, 7 pages.

* cited by examiner

Primary Examiner—Bhavesh M. Mehta
Assistant Examiner—Sheela Chawan
(74) Attorney, Agent, or Firm—Sterne, Kessler, Goldstein & Fox P.L.L.C.

(57) ABSTRACT

A method for determining magnitude and direction of spectral channel drift for several consecutive spectral regions over a wide spectral range. According to the method of the present invention, in-field testing of a spectral filter sequentially irradiated by two blackbody sources is performed to generate a response function of the spectral filter. The response function is ensemble averaged to reduce any noise. Background radiance is then removed to produce a smoothed spectral transmittance function of the spectral filter. The first derivative function of the smoothed spectral transmittance function is determined. The first derivative function is separated into spectral band regions having +/− N pixels on either side of the function minima. The value of N is selected to optimize the detection algorithm sensitivity to change while extending the limit of spectral shift magnitude. The sum of the differences between the first derivative function and a reference spectral derivative function is determined. The difference result is applied to a look-up table to determine magnitude and direction of spectral drift for each of the separated spectral band regions. Use of the present invention can provide information on spectral distortion or spectral smile for 2-D focal plane arrays used for hyperspectral imaging.

38 Claims, 12 Drawing Sheets

SPECTRAL DRIFT AND CORRECTION TECHNIQUE FOR HYPERSPECTRAL IMAGING SYSTEMS

This application claims the benefit of priority under 35 U.S.C. § 119(e) to application Ser. No. 60/221,270, filed Jul. 27, 2000, which is incorporated in its entirety herein by reference.

BACKGROUND OF THE INVENTION

1. Field of the Invention

The present invention relates generally to the field of imaging systems, and more particularly, to hyperspectral imaging systems. The invention further relates to a method for determining the magnitude and direction of spectral drift in hyperspectral imaging systems.

2. Related Art

All objects, such as soil, water, trees, vegetation, structures, metals, paints, fabrics, etc., create a unique spectral fingerprint. The unique spectral fingerprint is a measure of the electromagnetic energy that is reflected or thermally generated from an object when the object is being imaged. A sensor is used to determine the fingerprint. The sensor measures the light reflected from the object or the thermally radiated energy from the object, the majority of which registers in wavelengths or bands, invisible to humans.

Hyperspectral imaging refers to the imaging of an object over a large number of discrete, contiguous spectral bands. Hyperspectral imaging produces images for which a spectral signature is associated with each spatial resolution element or pixel. A cross between imaging and spectroscopy, hyperspectral imaging is an outgrowth of multi-spectral imaging. Multi-spectral imagers take one measurement in a wide portion of each major wavelength band. Unlike multi-spectral imagers, hyperspectral imagers measure energy in numerous narrow units of each band. The narrower bandwidths of a hyperspectral sensor are more sensitive to subtle variations in energy reflection or thermal generation. As a result, the hyperspectral signal is more detailed and contains more specific information about the object imaged.

A hyperspectral imager can see what cannot be seen by the human eye. Hyperspectral imaging, combined with image processing and analysis, can identify materials, classify features, identify trends, etc. Hyperspectral imaging can be used for, but is not limited to, medical photo-diagnosis, chemical detection, cloud tracking, earth resources, remote sensing of pollutants and other compounds in the atmosphere, soil, and waters, remote sensing of land and oceans, and target detection and recognition.

Hyperspectral imaging systems require precise control and identification of spectral channel assignments during image data recording. For precise radiometric and spectral detection algorithms to be effective it is essential to maintain spectral channel calibration during operation. Knowledge of the spectral bands during image processing allows utilization of a wide range of algorithms to determine material identification based upon spectral signature information.

Identification of the spectral channel assignments during imaging operations is required to determine the amount of spectral drift which can occur during mission environments and provide the information necessary to correctly reassign the spectral channels to the hyperspectral imagery. What is needed is a system and method for detecting spectral drift. What is further needed is a system and method for determining the amount as well as the direction of spectral drift.

SUMMARY OF THE INVENTION

The present invention is a method for detecting magnitude and direction of spectral drift in a hyperspectral imaging system. More particularly, the present invention is a method for determining magnitude and direction of spectral channel drift for several contiguous spectral regions over a wide spectral range in hyperspectral imaging systems. According to the method of the present invention, in-field testing with a spectral filter sequentially irradiated by two blackbody sources is performed to generate a response function of the spectral filter. The response function is ensemble averaged to reduce any noise. Background radiance is then removed to produce a smoothed spectral transmittance function of the spectral filter. The first derivative function of the spectral transmittance function is then determined. The first derivative function is partitioned into spectral band regions having +/− N pixels on either side of the function minima. The value of N is selected to optimize the detection algorithm sensitivity to change while extending the limit of spectral shift magnitude. The sum of the differences between the first derivative function and a reference spectral derivative function is determined. The difference result is applied to a look-up table to determine magnitude and direction of spectral drift for each of the partitioned spectral band regions.

Use of the present invention can provide information on spectral distortion or spectral smile for 2-D focal plane arrays used for hyperspectral imaging.

Further features and advantages of the invention, as well as the structure and operation of various embodiments of the invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

Figure 1A:
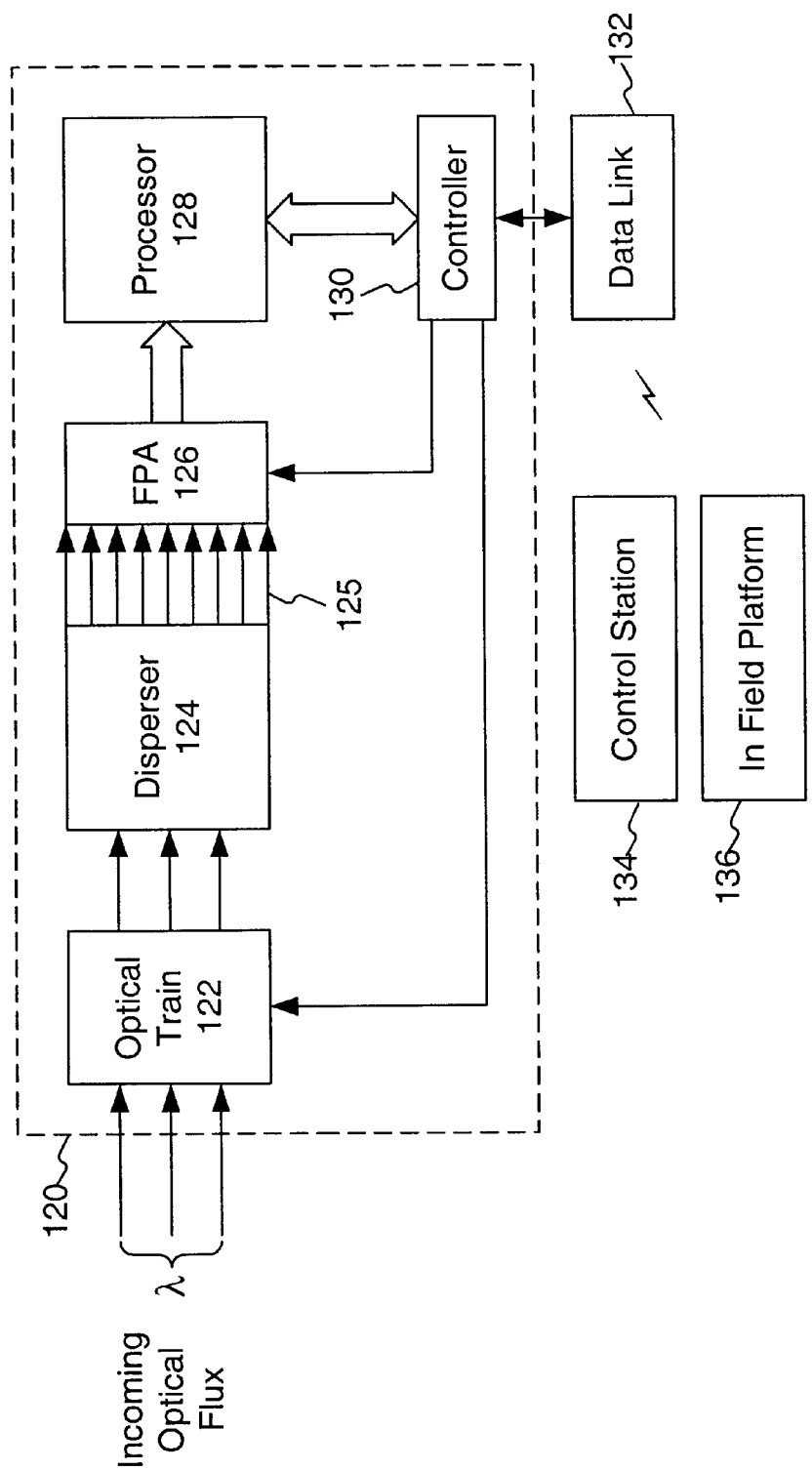
FIG. 1A is an exemplary block diagram illustrating a hyperspectral imaging system according to an embodiment of the present invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Overview

The present invention is a method for detecting magnitude and direction of spectral drift in a hyperspectral imaging system. The method of the present invention is designed to recalibrate the spectral channels of the hyperspectral imaging system while in field. Quantification of spectral channel drift during imaging operations is required to provide the information necessary to correctly recalibrate the spectral channels to a hyperspectral image cube data. In order to meet the needs of spectral channel drift detection and provide adequate information for channel correction, the methods described herein are designed to detect sub-pixel spectral drift, the magnitude of the spectral drift, and the direction of the spectral drift for spectral channel assignments. Sampling of a wide spectral range of the hyperspectral imaging system over several contiguous spectral regions allows non-linear detection of spectral drift and provides the information required for correction.

The methods described herein can be applied to any operational hyperspectral imaging system where the operational condition of "field" or "infield" is equivalently interpreted as, but is not limited to, "in-flight", "shipboard", "ground-based" or "space-borne". The methods described herein apply to all environments.

The present invention is described for long wave spectral regions in which radiation is thermally generated. In other words, the signature of an imaged object is a function of the temperature of the object and the spectral emissivity. Emissivity is the ratio of energy radiated by an object to the energy radiated by a blackbody at the same temperature. Emissivity is a function of wavelength and temperature. An ideal blackbody source is a material that absorbs all of the incident radiation, reflecting none. Blackbody sources are thermal sources with emissivity characteristics of approximately one. Blackbody sources follow Max Planck's blackbody equations in terms of optical spectral radiance. Planck's blackbody equations are well known to persons skilled in the relevant art(s). One skilled in the relevant art(s) would also know that the present invention is not limited to long wave spectral regions in which radiation is thermally generated, but is also applicable to other spectral regions, such as visible through mid wave, in which radiation is generated from solar energy.

In order for radiometric and spectral detection algorithms to be effective, spectral channel calibration must be maintained during hyperspectral image data recording. Spectral drift may occur during mission environments, making it necessary to reassign the spectral channels to the hyperspectral imagery. The present invention samples a wide spectral range of the hyperspectral image over several spectral regions for non-linear detection of spectral drift. The invention also provides the information required for correction.

Prior to describing the invention in detail, a brief description of a filter used to calibrate the hyperspectral system is discussed. The invention uses a SRM1921a Polystyrene filter, provided by NIST (National Institutes for Science and Technology), as the calibration filter. The SRM1921a calibration filter provides a calibrated spectrum that is used as a reference. The SRM1921a calibration filter has at least seven (7) spectral band regions over a spectral range of 8 to 11 $\mu$m. The SRM1921a calibration filter also provides additional bands over the spectral range of 3.2 to 18 $\mu$m. Although the present invention uses an SRM1921a polystyrene filter as the calibration filter, one skilled in the relevant art(s) would know that other filters having multiple spectral band regions over a desired spectral range maybe used as the calibration filter without departing from the scope of the present invention.

FIG. 1A is a block diagram illustrating an exemplary hyperspectral imaging system 120 according to an embodiment of the present invention. Hyperspectral imaging system 120 may be installed in an air-borne system, a space-borne system, or a ground-based system. Hyperspectral imaging system 120 comprises an optical train 122, a disperser 124, a focal plane detector array (FPA) 126, a processor 128, and a controller 130. Optical train 122 is coupled to disperser 124. Disperser 124 is coupled to FPA 126. FPA 126 is coupled to processor 128. Processor 128 is coupled to controller 130 via a bi-directional data bus. Controller 130 is also coupled to optical train 122 and FPA 126. Data link 132 is a bi-directional data link that also couples to controller 130. Data link 132 comprises a receiver and a transmitter for connecting data link 132 to an image and data processing station contained in one or both of a control station 134 or an in-field platform 136. In-field platform 136 may be an air-borne platform, a ground-based platform, or a space-borne platform.

The components (122, 124, 126, 128, and 130) of hyperspectral imaging system 120 work together to collect, detect, and process infrared radiation, represented by the greek symbol $\lambda$ (lambda). Infrared radiation ($\lambda$) is received by optical train 122. Optical train 122 comprises a steerable group of optical elements (not shown) which collect and focus the infrared radiation ($\lambda$). Controller 130 provides electromechanical control signals to enable optical train 122 to collect and focus the infrared radiation ($\lambda$). The infrared radiation ($\lambda$) collected by optical train 122 is sent to disperser 124. Disperser 124 may include a diffraction grating assembly, a compensated prism assembly, or an electro-optic device such as a Fabry-Perot etalon or acousto-optic assembly. Disperser 124 separates the received infrared radiation ($\lambda$) into spectral components and disperses the spectral components, as shown by arrows 125. The output of disperser 124 is incident upon FPA 126. FPA 126 is a focal plane detector array of pixels that sense each of the spectral bands of radiation produced by disperser 124 and generate a corresponding output signal. Controller 130 provides control lines for activating and directing the operation of the array for FPA 126. The corresponding output signal from FPA 126 is sent to processor 128 for processing.

Figure 1B:
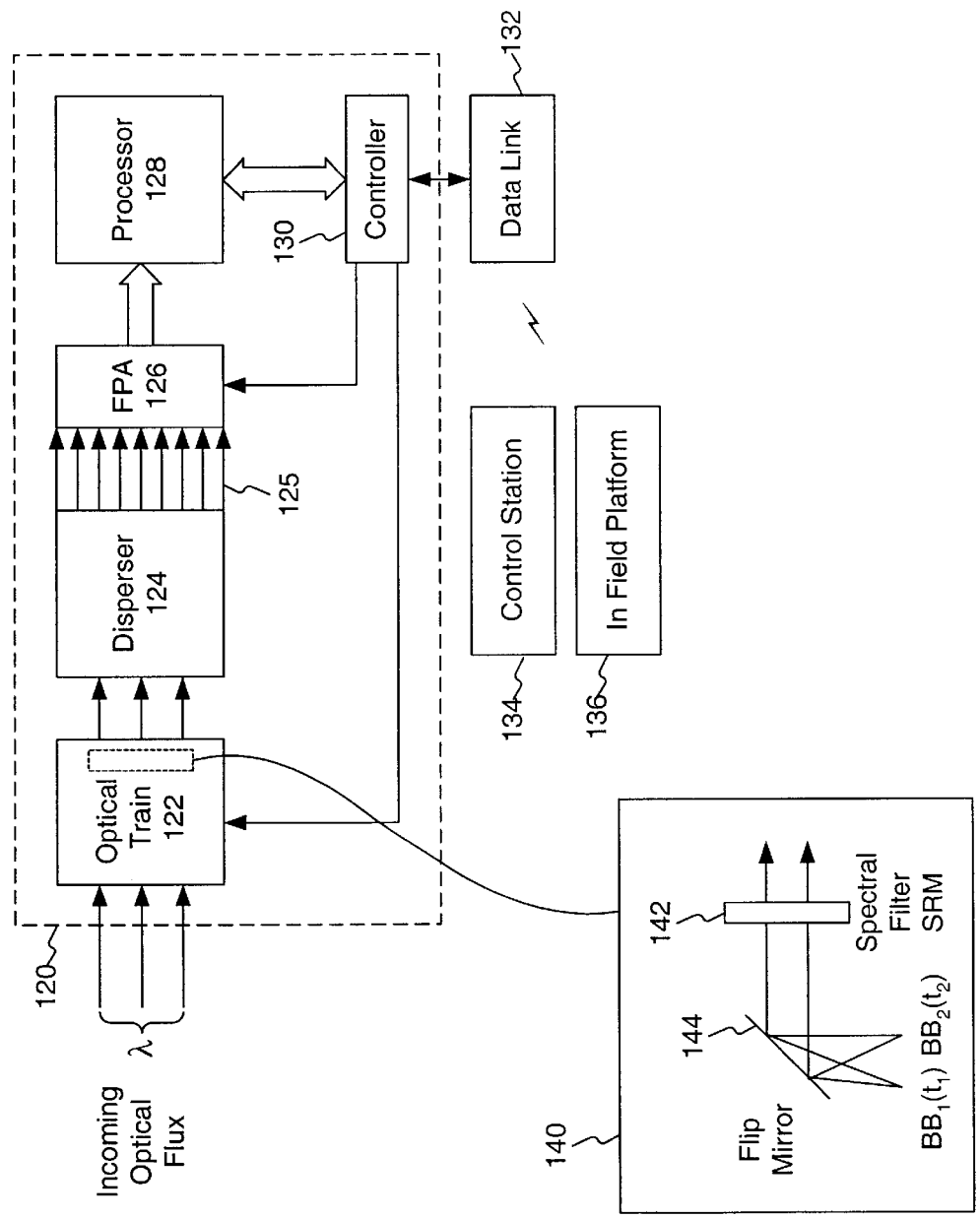
FIG. 1B is an exemplary block diagram illustrating a hyperspectral imaging system having a spectral calibration subsystem with two blackbody sources and a spectral calibration filter assembly according to an embodiment of the present invention.

During spectral channel calibration, the calibration filter is inserted into an optical path of the hyperspectral imaging system. This usually takes place before and after imaging sequences. FIG. 1B is an illustration of hyperspectral imaging system 120 displaying a spectral calibration subsystem 140 contained within optical train 122. Spectral calibration subsystem 140 is shown in phantom inside optical train 122 to indicate that subsystem 140 may be inserted and removed from optical train 122 depending upon the type of operation (i.e., calibration) being performed by hyperspectral imaging system 120. Spectral calibration subsystem 140 comprises two blackbody sources, $BB_1(t_1)$ and $BB_2(t_2)$, a spectral calibration filter 142 (such as the calibration filter described above), and a flip mirror 144. The two blackbody sources $BB_1(t_1)$ and $BB_2(t_2)$ are two separate blackbody sources that are pre-stabilized to two separate desired temperatures. Alternatively, one blackbody source could be used at two separate temperatures. Blackbody sources $BB_1(t_1)$ and $BB_2(t_2)$ are normally placed in an off-axis position relative to optical train 122. During spectral calibration operation, blackbody sources $BB_1(t_1)$ and $BB_2(t_2)$ are placed sequentially within the path of optical train 122 using flip mirror 124. Spectral calibration filter 142 may also be placed in the path of optical train 122, with or without blackbody sources $BB_1(t_1)$ and $BB_2(t_2)$. Spectral calibration operations are described in detail below.

Figure 1C:
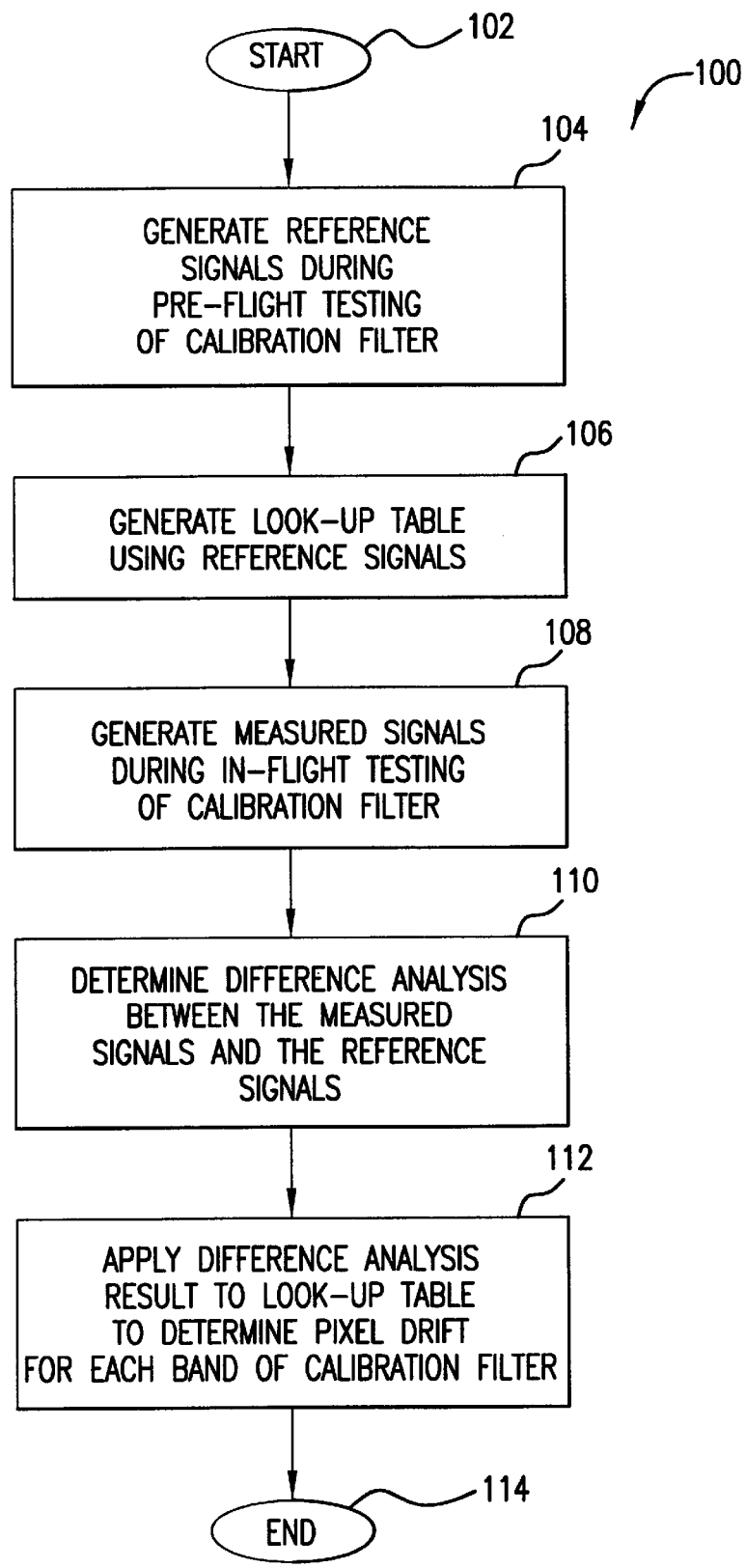
FIG. 1C is a high level flow chart illustrating a method for determining magnitude and direction of spectral channel drift for a hyperspectral imaging system according to an embodiment of the present invention.

FIG. 1C is a high level flow diagram describing a method for determining magnitude and direction of spectral channel drift for the hyperspectral imaging system. The process begins with step 102, and proceeds immediately to step 104.

In step 104, reference signals are generated during pre-field testing of calibration filter 142. Pre-field testing involves measuring the spectrum of calibration filter 142 using two blackbody temperatures. Pre-field tests are performed in a controlled laboratory environment. The generation of reference signals is described below in greater detail with reference to FIG. 2.

In step 106, a look-up table is generated using the reference signals generated from step 104. The look-up table provides magnitude and direction of pixel drift for each spectral band region of calibration filter 142. The generation of the look-up table is described below with reference to FIG. 5.

In step 108, measured signals of calibration filter 142 are generated during in-field testing. In-field testing is performed during airborne, ground-based, or ship-borne missions, and involves measuring the spectrum of calibration filter 142 using two blackbody temperatures. The generation of measured signals is described below with reference to FIG. 7.

In step 110, a sum of the differences analysis between the measured signals and the reference signals is performed. The sum of the differences analysis results in a value that is applied to the look-up table generated in step 106.

In step 112, the difference analysis result is applied to the look-up table to determine both the magnitude of pixel drift and the direction of pixel drift in the +/− spectral direction for the corresponding spectral band region of calibration filter 142. Spectral channel assignments for each pixel in each band of calibration filter 142 can then be corrected using the results from the look-up table. The process ends at step 114.

Pre-Field Measurements and Analysis

Figure 2:
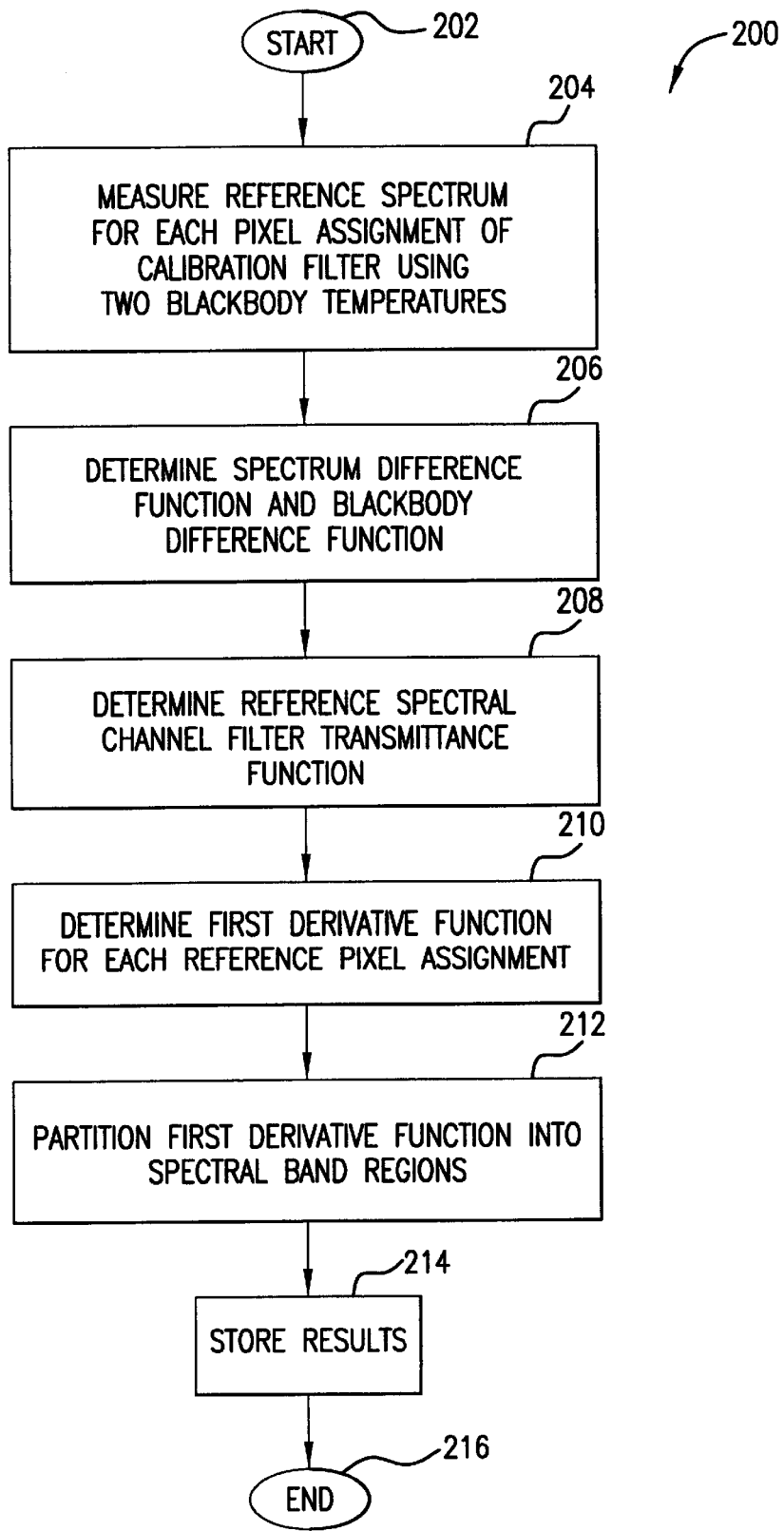
FIG. 2 is a flow diagram describing a method for generating reference signals during pre-field testing.

FIG. 2 is a flow diagram describing a method 200 for generating reference signals during pre-field testing. The process begins with step 202, and proceeds immediately to step 204.

In step 204, the reference spectrum for each pixel assignment of calibration filter 142 is measured. The reference spectrum is measured with calibration filter 142 being irradiated by two blackbody temperatures $BB_1(t_1)$ and $BB_2(t_2)$, selected sequentially using flip mirror 144. Actuation of flip mirror 144 in a first position with calibration filter 142 in the optical path provides the correct spectral flux distribution for a blackbody source at temperature $t_1$ ($BB_1(t_1)$). The response reference spectrum for each pixel assignment when calibration filter 142 is irradiated by a reference blackbody source at temperature $t_1(BB_1(t_1))$ is $$RPCF_I(t_1) \qquad (1)$$

where: I represents a pixel assignment for each spectral band in calibration filter 142. Each pixel assignment is defined in the spectral domain and, for the present example, each pixel has a finite spectral width of 16.67 mm and I=1, . . . , 185. Actuation of flip mirror 144 to a second position with calibration filter 142 in the optical path provides the correct spectral flux distribution for a blackbody source at temperature $t_2$ ($BB_2(t_2)$). The response reference spectrum for each pixel assignment when calibration filter 142 is irradiated by a reference blackbody source at temperature $t_2$ ($BB_2(t_2)$) is $$RPCF_I(t_2) \qquad (2)$$

Measurements are also obtained for the reference blackbody source at temperatures $t_1$ and $t_2$ without calibration filter 142. Flip mirror 144 is actuated to the first position without calibration filter 142 for the blackbody source at temperature $t_1(BB_1(t_1))$. The response for the reference blackbody source at temperature $t_1$ is $$RPBB_I(t_1) \qquad (3)$$

Flip mirror 144 is actuated to the second position without calibration filter 142 for the blackbody source at temperature $t_2(BB_2(t_2))$. The response for the reference blackbody source at temperature $t_2$ is $$RPBB_I(t_2) \qquad (4)$$

Several frames of data are captured during the measurement of the reference spectrum pixel assignment for ensemble averaging. For example, in one embodiment, 128 consecutive spectral frames for $RPCF_I(t_1)$, $RPCF_I(t_2)$, $RPBB_I(t_1)$, and $RPBB_I(t_2)$ are captured and ensemble averaged. The corresponding ensemble averaged functions are $ERPCF_I(t_1)$, $ERPCF_I(t_2)$, $ERPBB_I(t_1)$, and $ERPBB_I(t_2)$, respectively. Ensemble averaging reduces measurement system noise that may have resulted.

In step 206, background radiance due to the filter and blackbody spectral emittance is removed to produce a smoothed spectral transmittance profile of calibration filter 142. Background radiance is removed using a spectrum difference function and a blackbody difference function. The filter spectrum difference function subtracts the response reference spectrum for the two blackbody temperatures. The filter spectrum difference function is $$DRPCF_I = ERPCF_I(t_1) - ERPCF_I(t_2) \qquad (5)$$

The blackbody difference function is the difference between the responses for the reference blackbody sources at the two temperatures $t_1$ and $t_2$. The reference blackbody difference function is $$RBBDF_I = ERPBB_I(t_1) - ERPBB_I(t_2) \quad (6)$$

Figure 3:
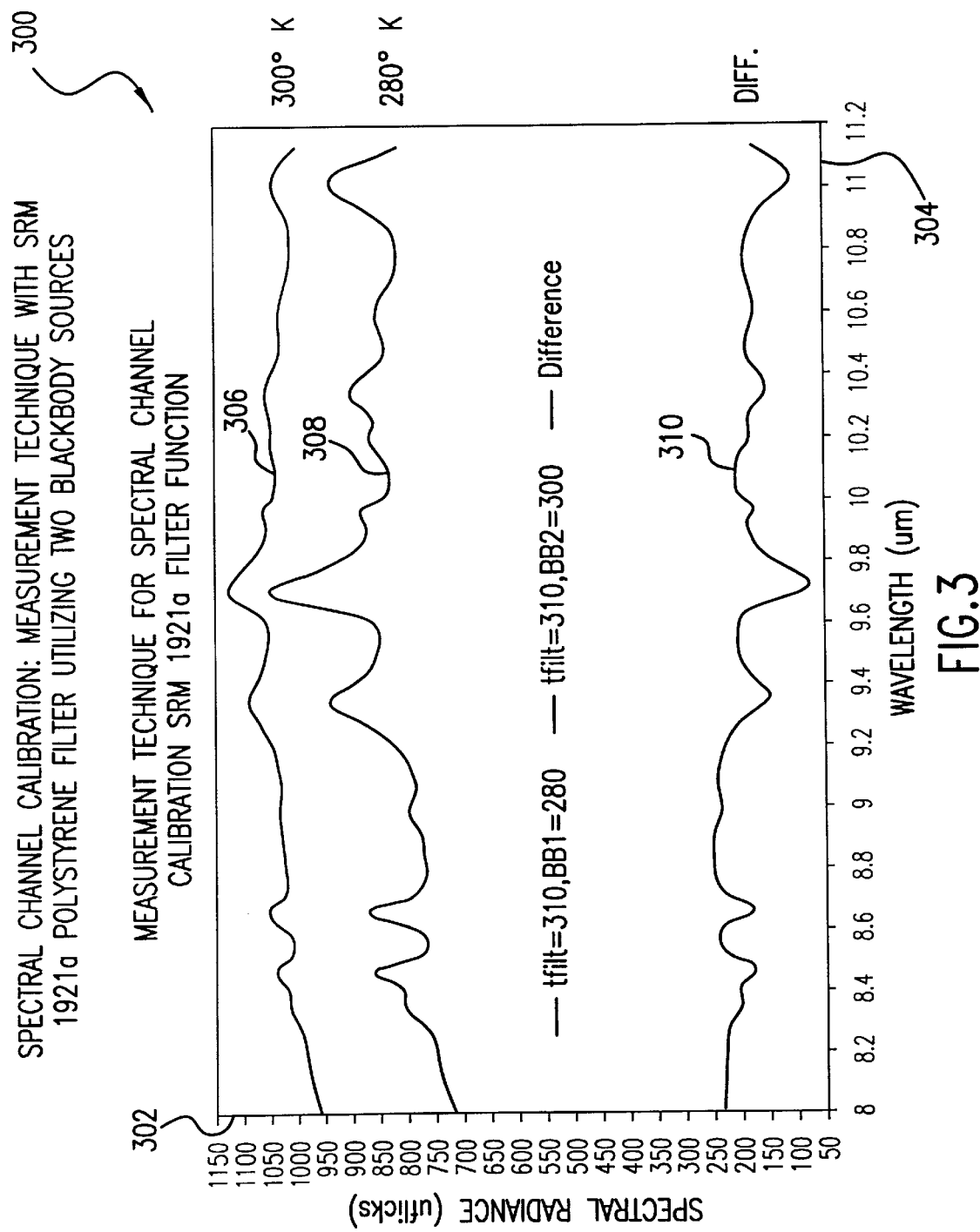
FIG. 3 is a graph illustrating exemplary spectral channel calibration filter measurements for an SRM1921a Polystyrene Filter utilizing two blackbody sources.

FIG. 3 is a graph 300 illustrating exemplary spectral channel calibration filter measurements for an SRM1921a Polystyrene Filter utilizing two blackbody sources ($BB_1(t_1)$ and $BB_2(t_2)$). A y-axis 302 of graph 300 represents spectral radiance (flicks) and an x-axis 304 represents wavelength ($\mu$m). A first plot 306 represents the reference spectrum of calibration filter 142 irradiated by the reference blackbody source at temperature $t_1$ ($BB_1(t_1)$). Temperature $t_1$ is 300° Kelvin (K). A second plot 308 represents the reference spectrum of calibration filter 142 irradiated by the reference blackbody source at temperature $t_2(BB_2(t_2))$. Temperature $t_2$ is 280° K. A third plot 310 represents the spectrum difference function for the reference spectrum of calibration filter 142 irradiated by the reference blackbodies at temperatures $t_1$ and $t_2$ ($BB_1(t_1)$ and $BB_2(t_2)$).

Returning to FIG. 2, in step 208, the reference spectral transmittance function for calibration filter 142 is determined. The reference spectral transmittance function is equal to the spectrum difference function divided by the blackbody difference function.

$$RP_I(\text{ref}) = DRPCF_I / RBBDF_I \quad (7)$$

Figure 4:
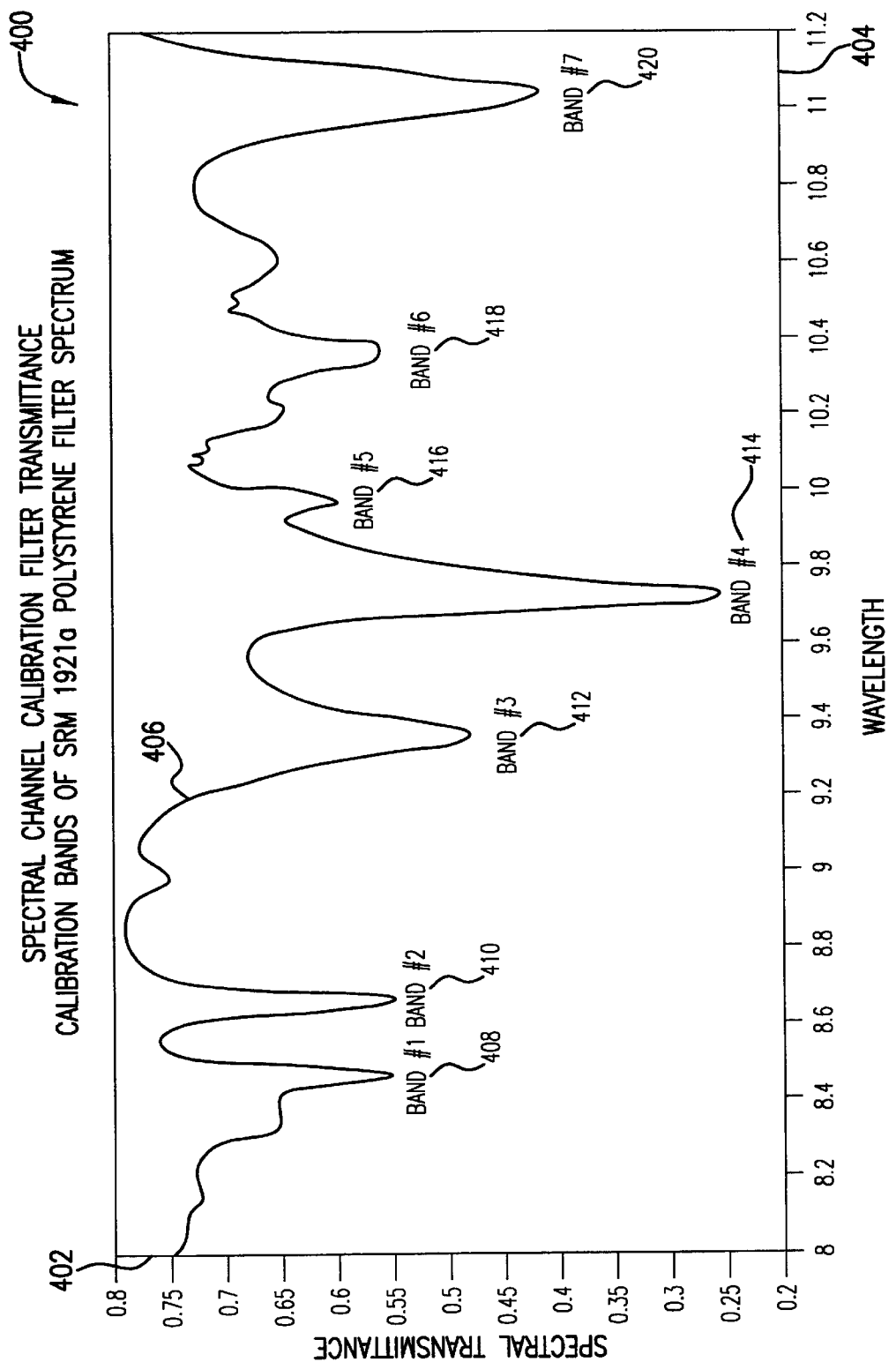
FIG. 4 is a graph of an exemplary spectral channel filter transmittance function.

Calibration filter data, supplied by NIST, for the SRM1921a filter is compared with the reference spectral transmittance function $RP_I(\text{ref})$. Using the NIST supplied calibration filter data, wavelength bands are assigned to each of the spectral pixel channels. FIG. 4 is a graph 400 of an exemplary spectral channel filter transmittance function for the SRM1921a Polystyrene filter. A y-axis 402 of graph 400 displays a spectral transmittance and an x-axis 404 displays a wavelength ($\mu$m). As shown in graph 400, calibration filter 142 provides a stable spectral transmittance band profile 406 over an exemplary range of 8 to 11 $\mu$m. Calibration filter 142 displays multiple spectral transmittance bands 408–420 over the required spectral range. Each transmittance band 408–420 has a spectral transmittance bandwidth of at least 50 nm at FWHM (full width half maximum). The spectral transmittance bands 408–420 are insensitive to thermal drift over a 0° to 50° C. ambient temperature.

Returning to FIG. 2, in step 210, a first derivative function for each reference pixel assignment of the spectral transmittance function is determined. The discrete first derivative function is $$dRP_I = \Delta RP_I / \Delta \lambda_I = (RP_{I+1} - RP_I)/(\lambda_{I+1} - \lambda_I) \quad (8)$$

where: $\Delta RP_I$ is the change in the reference spectral transmittance function between pixels; and $\Delta \lambda_I$ is the change in wavelength between pixels.

The first derivative function, $dRP_I$, is then normalized. The first step in the normalization process eliminates all negative values of the first derivative function $dRP_I$ by adding a positive value to each discrete value of the first derivative function (shown below as $dRP_I(\text{positive})$). The magnitude of the positive value is equal to the magnitude of the greatest negative value of the first derivative function, $dRP_I$. The normalized value of the first derivative function, $dRP_I$ normalized), is obtained by dividing the resultant discrete values of $dRP_I(\text{positive})$ by the maximum positive value of $dRP_I(\text{positive})$ to enable the greatest value of the normalized first derivative function to be equal to one (1).

$$dRP_I(\text{positive}) = (dRP_I + MAG(\text{greatest negative value}(dRP_I))) \quad (9)$$

$$dRP_I(\text{normalized}) = dRP_I(\text{positive})/(\text{maximum value }(dRP_I(\text{positive})) \quad (10)$$

To implement the full sensitivity to spectral drift required for hyperspectral imaging applications, the normalized first derivative function is further sampled. Seven localized minima for the normalized first derivative function $dRP_I$ (normalized) are determined. The seven localized minima are based upon the SRM1921a filter function. The seven localized minima are labeled with increasing values from 1 to 7, with the label 1 being assigned to the shortest wavelength and the label 7 being assigned to the longest wavelength. A record length for each of the seven localized minima of the normalized first derivative function ($dRP_I$ normalized)) is truncated. Truncation of the record length is performed using seven segments. Each segment is centered upon the pixel location of the localized minima. Each segment length is set equal to +/− N(Z)+1, where N is equal to the number of pixels on either side of the localized minima and Z is referred to as the spectral band zone for each segment (1, . . . , 7) of the normalized first derivative function ($dRP_I$ (normalized)).

In step 212, the normalized reference first derivative function is separated into spectral band regions and truncated with +/− N pixels on either side of the localized minima. The value of N is selected to optimize the detection algorithm sensitivity to change while extending the limit of spectral shift magnitude. The spectral band per pixel is defined by the optical geometry of system focal length and detector size, along with the spectral dispersion rate design of the hyperspectral imaging system. In one embodiment, N=+/−10 pixels for each of seven zones, where one pixel is equivalent to 16.67 nm.

In yet another embodiment, the value of N may change according to the spectral band zone. In an embodiment where a certain value of N is found to be sensitive for some of the zones, yet insensitive for other zones, the value of N may be changed for those zones found to be insensitive. For example, in one embodiment, a value of N=+/−10 pixels shows good sensitivity for zones 1, 3, 4, 5, and 7, but not for zones 2 and 6. Thus, to provide good sensitivity for all seven zones, N is set equal to +/−10 for zones 1, 3, 4, 5, and 7, and N is less than 7 for zones 2 and 6. One skilled in the relevant art(s) would know that other values of N could be used based on the parameters of the hyperspectral imaging system without departing from the scope of the present invention.

In step 214, the reference spectral transmittance function and the first derivative functions of the reference spectral transmittance function are stored as reference signals. The process ends at step 216.

Generation of the Look-up Table

Figure 5:
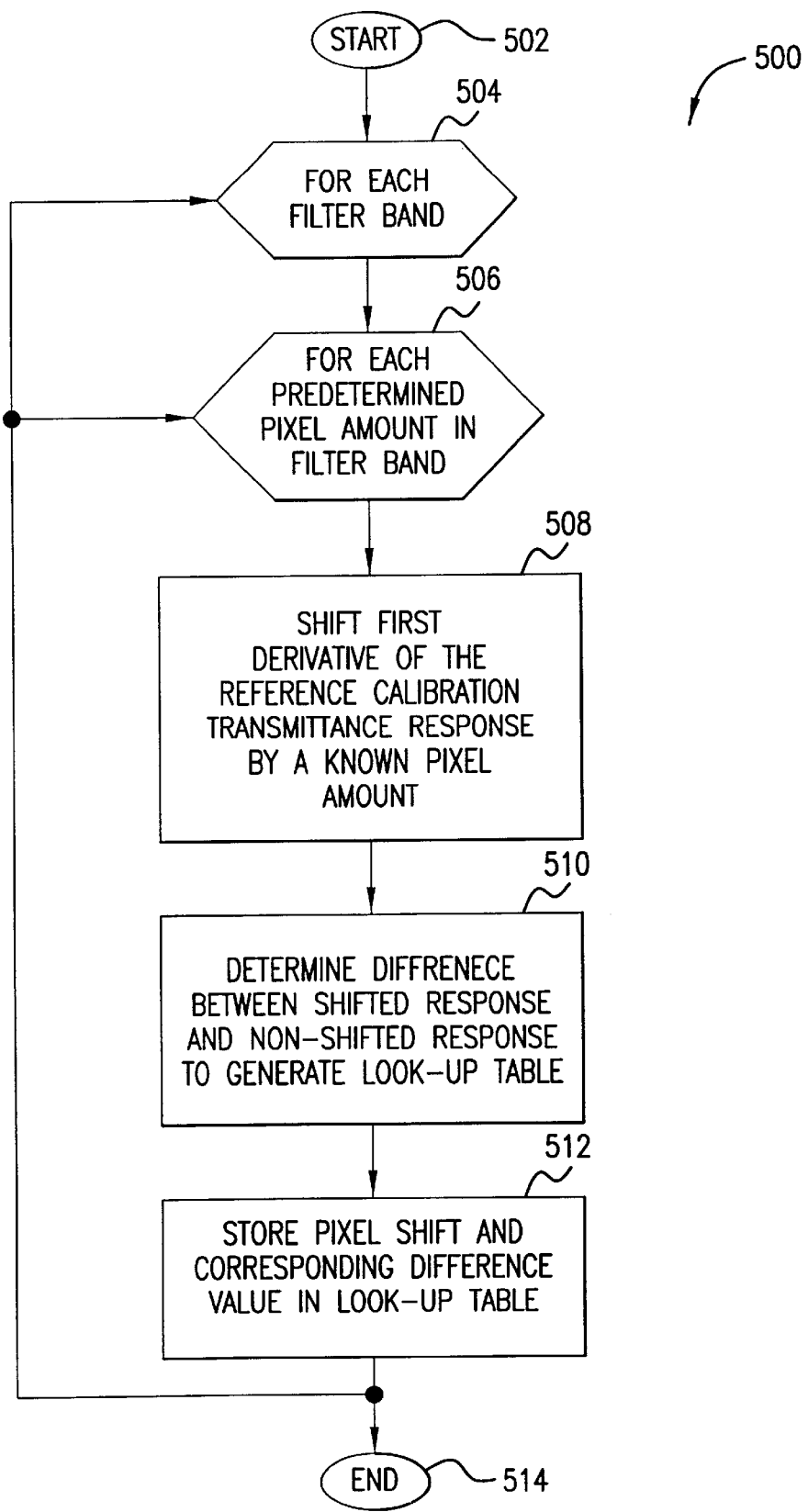
FIG. 5 is a flow diagram describing a method for generating a look-up table for the detection of spectral drift in hyperspectral imaging systems.

FIG. 5 is a flow diagram describing a method for generating a look-up table for the detection of spectral drift in hyperspectral imaging systems. The look-up table is generated using the first derivative of the reference spectral transmittance function for each spectral band of calibration filter 142. The process begins with step 502, and proceeds immediately to step 504.

In step 504, the process begins for each spectral band. For example, the SRM1921a polystyrene filter has seven prominent bands in which a localized minima results (see FIG. 4). This requires the process beginning with step 504 to be repeated seven times.

In step 506, the process begins for each predefined pixel shift within each filter band. For example, if the look-up table provides results for pixel shifts of ½, the process will be repeated for every ½ pixel shift within the filter band.

In step 508, the first derivative of the reference spectral transmittance function is shifted by a known pixel amount. The first derivative of the reference spectral transmittance function is shifted in both a positive and a negative direction in order to obtain magnitude and direction of spectral drift.

In step 510, a difference value is determined by taking the difference between the shifted first derivative function and the non-shifted first derivative function.

In step 512, the difference value along with the known pixel shift are stored in the look-up table. The process returns to step 506 to complete the look-up table for the current filter band by recursively repeating steps 506 to 512. Upon completion of the look-up table for the current filter band, the process returns to step 504 to begin the process for the next filter band by recursively repeating steps 504 to 512. Upon completion of the last filter band, the process proceeds to step 514.

In step 514, the look-up table is stored in memory. The process ends at step 516.

Figure 6:
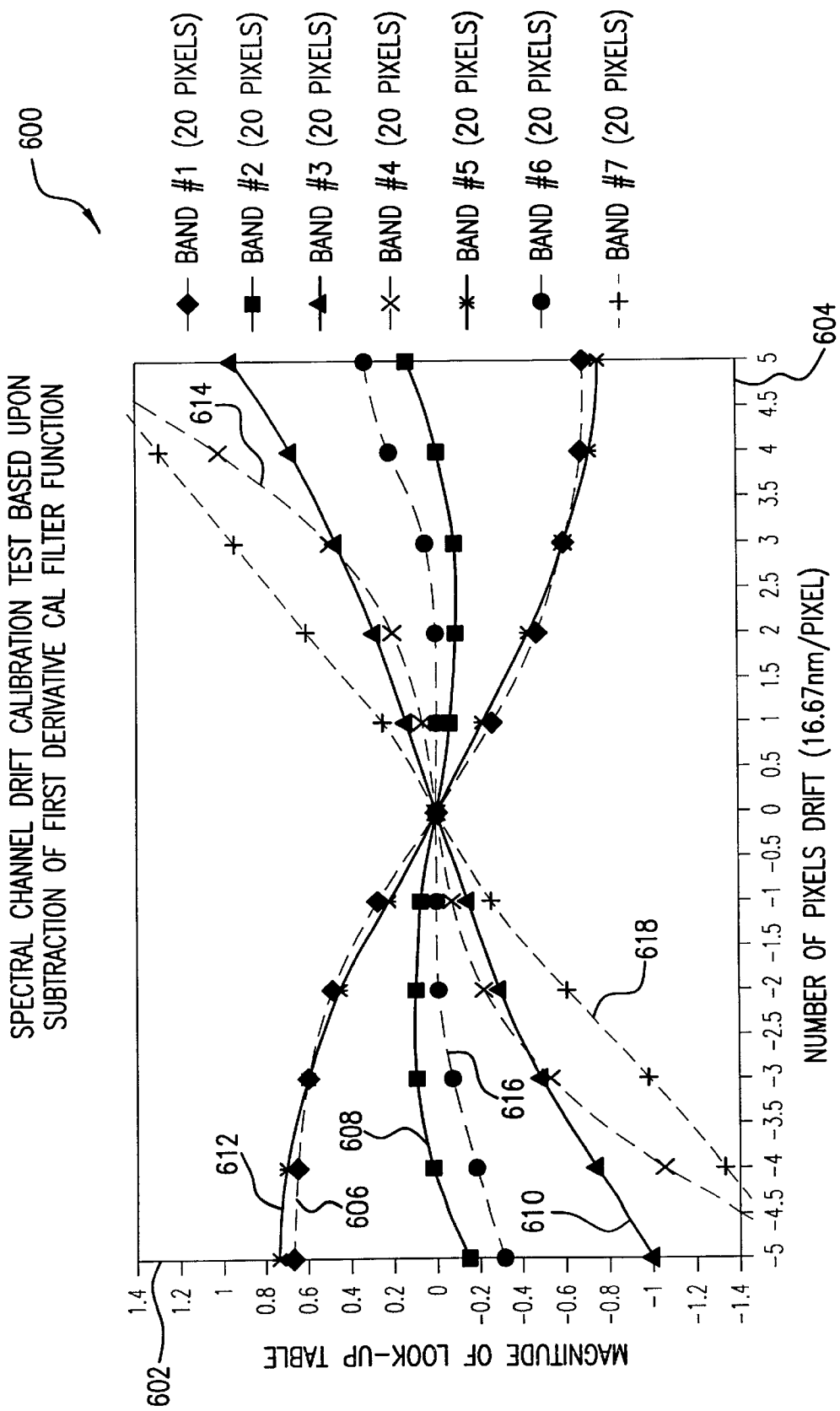
FIG. 6 is a graph illustrating an exemplary spectral channel drift look-up table for each filter band of the SRM1921a polystyrene filter.

FIG. 6 is a graph 600 illustrating the function plots of an exemplary spectral channel drift look-up table for each of the defined filter bands of the SRM1921a polystyrene calibration filter. A y-axis 602 displays the magnitude of the look-up table or the difference value and an x-axis 604 displays the number of pixel drifts. The number of pixel drifts is displayed from −5 to +5 in increments of ½. A first plot 606 displays the difference value for a given pixel drift for filter band 408. A second plot 608 displays the difference value for a given pixel drift for filter band 410. A third plot 610 displays the difference value for a given pixel drift for filter band 412. A fourth plot 612 displays the difference value for a given pixel drift for filter band 414. A fifth plot 614 displays the difference value for a given pixel drift for filter band 416. A sixth plot 616 displays the difference value for a given pixel drift for filter band 418. And a seventh plot 618 displays the difference value for a given pixel drift for filter band 420.

In-Field Measurements and Analysis

Figure 7:
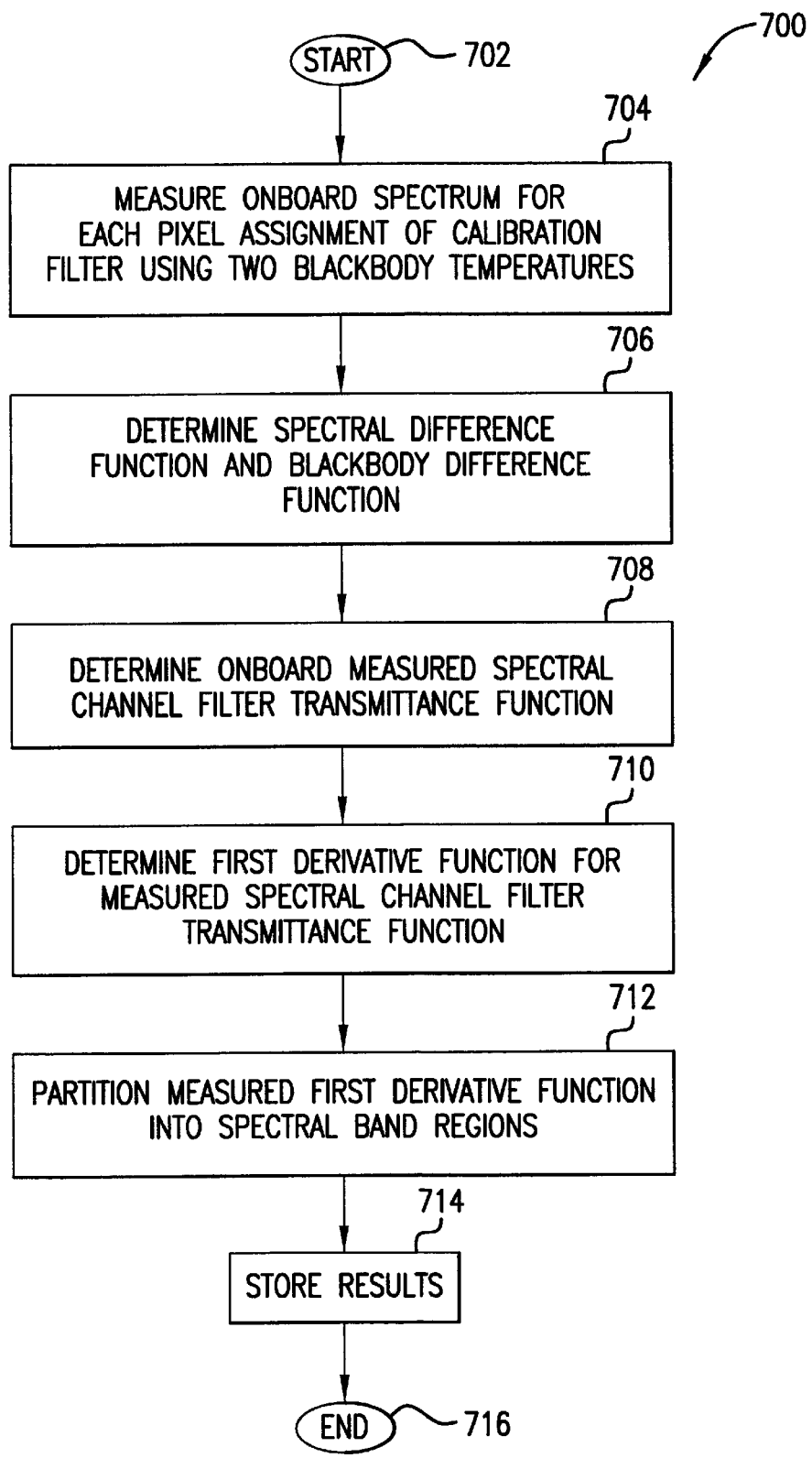
FIG. 7 is a flow diagram describing a method for generating measured signals during in-field testing of the calibration filter.

FIG. 7 is a flow diagram describing a method 700 for generating measured signals during in-field testing of calibration filter 142. Method 700 is very similar to method 200, except that the measured signals are generated from in-field measurements of calibration filter 142. The process begins with step 702, and proceeds immediately to step 704.

In step 704, the in-field spectrum for each pixel assignment of calibration filter 142 is measured. The in-field spectrum is measured with calibration filter 142 being irradiated by two blackbody temperatures $BB_1(t_1)$ and $BB_2(t_2)$, selected sequentially using flip mirror 144. Flip mirror 144 is an actual mirror that flips into the optical path of the hyperspectral imaging system during calibration to allow the focal plane of the system to view the blackbodies ($BB_1(t_1)$ and $BB_2(t_2)$) and spectral filter 142 in the optical path. Flip mirror 144 flips out of the optical path during actual imaging. The response spectrum for each pixel assignment when calibration filter 142 is irradiated by an onboard blackbody source at temperature $t_1$ ($BB_1(t_1)$) is $$MPCF_I(t_1) \tag{11}$$

where: I represents a pixel assignment for each spectral band 408-420 of calibration filter 142. As previously stated, for the present example, each pixel has a finite spectral width of 16.67 nm and I=1, ..., 185. The response spectrum for each pixel assignment when calibration filter 142 is irradiated by the onboard blackbody source at temperature $t_2$ ($BB_2(t_2)$) is $$MPCF_I(t_2) \tag{12}$$

Measurements are also obtained for the onboard blackbody at temperature $t_1$ and $t_2$ ($BB_1(t_1)$ and $BB_2(t_2)$) without calibration filter 142. The response for the onboard blackbody source at temperature $t_1$ ($BB_1(t_1)$) is $$MPBB_I(t_1) \tag{13}$$

The response for the onboard blackbody source at temperature $t_2$ ($BB_2(t_2)$) is $$MPBB_I(t_2) \tag{14}$$

Several frames of data are collected at equivalent frame times. For example, 128 frames of data are collected for the onboard blackbody source at $t_1$ $BB_1(t_1)$) and then 128 frames of data are collected for the onboard blackbody source at $t_2$ ($BB_2(t_2)$). The filter dwell time for 128 frames is equal to 1.1×128×frame time. The frame time range can vary from 2.5 ms to 9 ms, depending on the flight parameters of altitude, ground speed, and path phenomenology. Although values for the number of frames, frame time, and filter dwell time are given as 128, 2.5 to 9 ms, and 1.1× 128×frame time, respectively, one skilled in the relevant art(s) would know that other values for the number of frames, frame times, and filter dwell time may be used without departing from the scope of the present invention. The frame data is ensemble averaged for each blackbody or blackbody and filter combination. For example, in one embodiment, 128 consecutive spectral frames for $MPCF_I(t_1)$, $MPCF_I(t_2)$, $MPBB_I(t_1)$, and $MPBB_I(t_2)$ are captured and ensemble averaged. The corresponding ensemble averaged functions are $EMPCF_I(t_1)$, $EMPCF_I(t_2)$, $EMPBB_I(t_1)$, and $EMPBB_I(t_2)$. Ensemble averaging reduces any noise that may have resulted from the measurement system.

In step 706, background radiance is removed to produce a smoothed spectral transmittance profile of calibration filter 142. Background radiance is removed using a spectral difference function and a blackbody difference function. The use of two blackbody temperatures enables the subtraction of the spectral radiance of the filter, thereby resulting in a pure transmittance function. The spectral difference function is $$DMPCF_I = EMPCF_I(t_1) - EMPCF_I(t_2) \tag{15}$$

The blackbody difference function is the difference between the responses for the onboard blackbody at the two temperatures, $t_1$ and $t_2$. The blackbody difference function is $$MBBDF_I = EMPBB_I(t_1) - EMPBB_I(t_2) \tag{16}$$

In step 708, the onboard measured transmittance function for calibration filter 142 for each pixel assignment is determined. The onboard measured transmittance function is equal to the measured spectral difference function divided by the measured blackbody difference function.

$$MP_I(ref) = DMPCF_I / MBBDF_I \tag{17}$$

In step 710, a first derivative function for the measured transmittance function for each pixel assignment is determined. The discrete first derivative function is $$dMP_I = \Delta MP_I / \Delta \lambda_I = (MP_{I+1} - MP_I) / (\lambda_{I+1} - \lambda_I) \tag{18}$$

where: $\Delta MP_I$ is the change in the measured transmittance function between pixels and $\Delta \lambda_I$ is the change in wavelength between pixels. The first derivation function is used to create a non-symmetrical profile function while maintaining precise absorption band information.

The first derivative function ($dMP_I$) is then normalized by first adding a positive value to each discrete value to eliminate all negative values of the first derivative function (shown below in equation (19) as $dMP_I$(positive)). The magnitude of the positive value is equal to the magnitude of the greatest negative value of the first derivative function, $DMP_I$. Then the normalized first derivative function, $dMP_I$ (normalized), is obtained by dividing the resultant discrete values of $dMP_I$(positive) by the maximum positive value of $dMP_I$(positive) as shown in equation (20).

$$dMPI(\text{positive})=(dMP_I+MAG(\text{greatest negative value}(dMP_I))) \quad (19)$$

$$dMP_I(\text{normalized})=dMP_I(\text{positive})/(\text{maximum value }(dMP_I(\text{positive})) \quad (20)$$

The normalized first derivative function is further sampled to implement the full sensitivity to spectral drift required for hyperspectral imaging applications. In one embodiment, seven localized minima for the normalized first derivative function are determined. The seven localized minima are based upon the SRM1921a filter function. The seven localized minima are labeled with increasing values from 1 to 7, with the label 1 being assigned to the shortest wavelength and the label 7 being assigned to the longest wavelength. A record length for each of the seven localized minima of the normalized first derivative function is truncated. Truncation of the record length is performed using seven segments. Each segment is centered upon the pixel location of the localized minima. Each segment is set equal to $+/-N(Z)+1$, where N is equal to the number of pixels on either side of the localized minima and Z is referred to as the spectral band zone for each segment (1, ..., 7) of the normalized first derivative function ($dMP_I$(normalized)).

In step 712, the measured first derivative function is partitioned into spectral band regions and truncated with +/– N pixels on either side of the localized minima. The value of N is selected to optimize the detection algorithm sensitivity to change while extending the limit of spectral shift magnitude. The spectral band per pixel is defined by the optical geometry of system focal length and detector size, along with the spectral dispersion rate design of the hyperspectral imaging system. In one embodiment, N=+/–10 pixels for all seven zones, where one pixel is equivalent to 16.67 nm.

In another embodiment, the value of N may change with respect to the spectral band zone. For example, in an embodiment where a certain value of N is found to be sensitive for some of the zones, yet insensitive for other zones, the value of N may be changed for those zones found to be insensitive to that value of N. One skilled in the relevant art(s) would know that other spectral band per pixel sizes could be used based on the parameters of the hyperspectral imaging system without departing from the scope of the present invention.

In step 714, the measured spectral transmittance function for each pixel assignment and the first derivative functions of the measured spectral transmittance function are stored as measured signals. The process ends at step 716.

Figure 8:
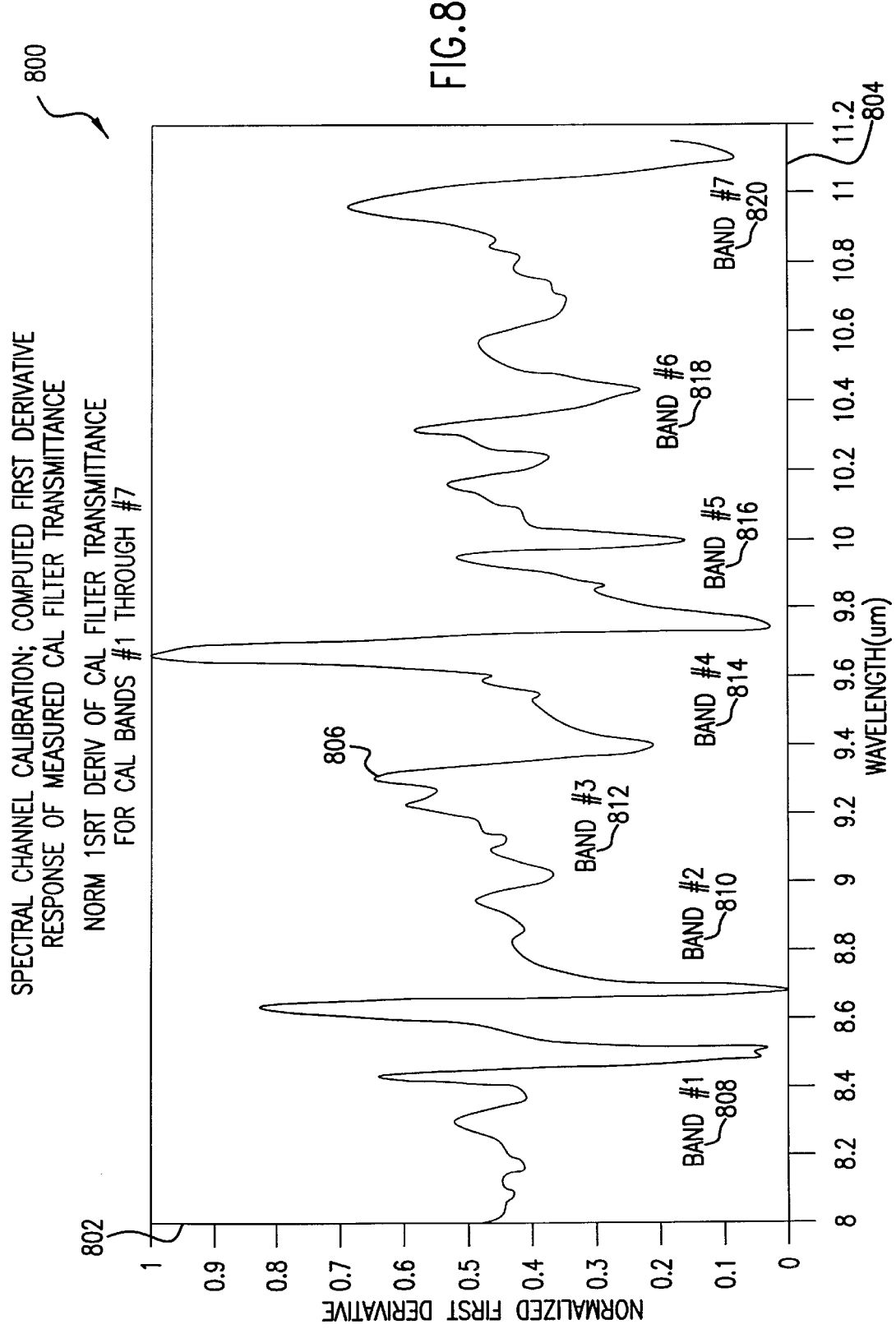
FIG. 8 is a graph illustrating an exemplary first derivative response of the measured calibration filter transmittance.

FIG. 8 is a graph 800 illustrating an exemplary first derivative response of the measured calibration filter transmittance function. Graph 800 comprises a y-axis 802 displaying a normalized first derivative response of the measured calibration filter transmittance, an x-axis 804 displaying wavelength ($\mu$m), and a plot of the normalized first derivative response of the measured calibration filter transmittance function 806. Plot 806 identifies each filter band 808-820 of calibration filter 142. Note that the filter bands are centered around localized minimas of the spectrum.

Determining Magnitude and Direction of Spectral Drift

Returning to FIG. 1, step 110, the difference analysis between the measured signals and the reference signals involves the determination of a pixel shift magnitude value, $PSM_B(k)$, which is the sum of the differences between the measured first derivative function and the reference first derivative function from a starting point pixel number to an ending point pixel number.

$$PSM_B(k)=\Sigma(dMP_I(k)-dRP_I(k)), \text{ from } I=n \text{ to } n+20 \quad (21)$$

where: n=starting point pixel number for band k; n+20= ending point pixel number for band k; and k=1, 2, 3, ..., 7 for each of the seven significant band zones of calibration filter 142. Spectral shifts are detected to within ½ pixel. Once the pixel shift magnitude value is determined, the process proceeds to step 112.

In step 112, the pixel shift magnitude value is the difference value that is applied to the look-up table to determine pixel drift magnitude and direction. For example, referring back to FIG. 6, if the pixel shift magnitude or difference value is 0.7 for band 1, the pixel drift would be –5.

The pixel drift magnitude and direction are used to generate new spectral channel assignments for each pixel of the corresponding band for correcting the pixel drift. Interpolation methods are used to determine the in-between values.

Although the present invention has been described using the SRM1921a filter, other filters having more or less filter bands and different wavelengths may be implemented without departing from the scope of the present invention.

Other Features of the Invention

Figure 10:
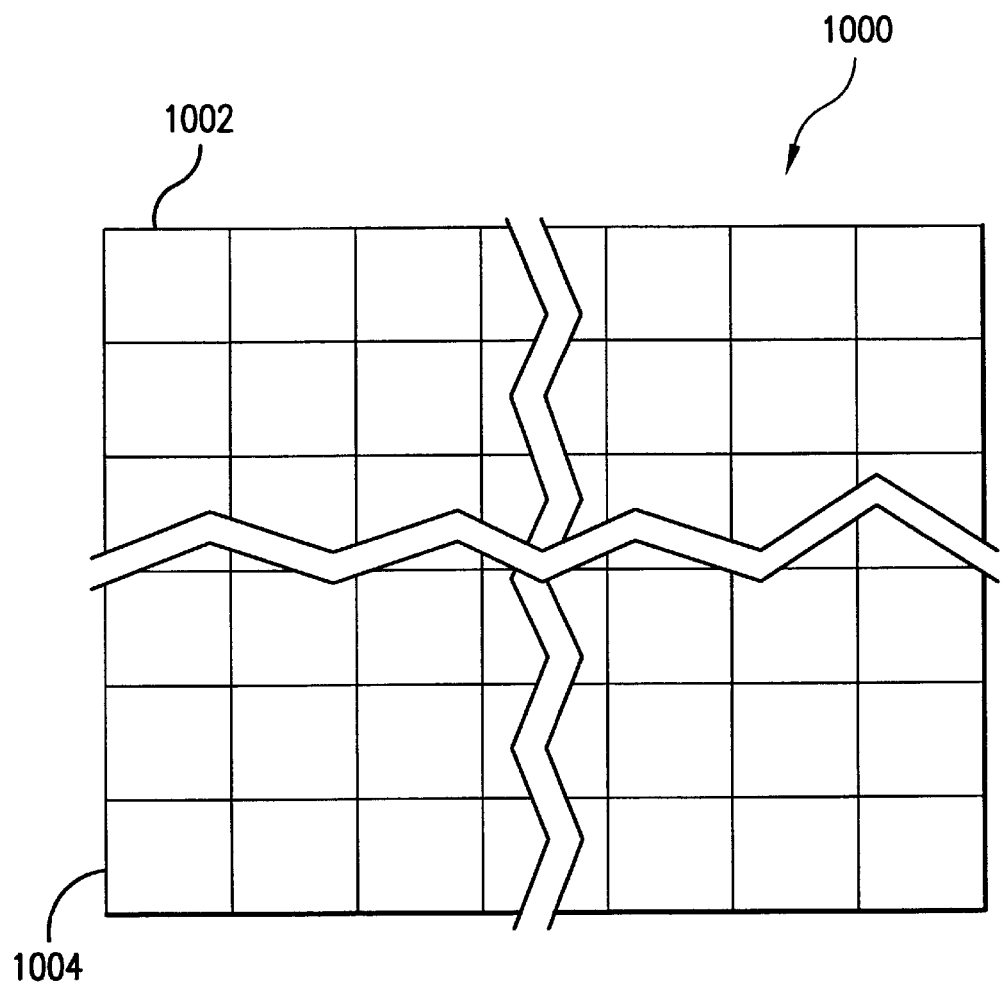
FIG. 10 is a diagram illustrating an exemplary 2-D focal plane array used for hyperspectral imaging.

The present invention also provides the ability to measure and correct magnitude and direction of spectral drift for different spatial pixels in a 2-D focal plane array. The invention provides information on spectral distortion and spectral smile for 2-D focal plane arrays. FIG. 10 is a diagram illustrating an exemplary 2-D focal plane array 1000 used for hyperspectral imaging. 2-D focal plane array 1000 is comprised of columns 1002 and rows 1004 of data. Each column 1002 represents spectral pixels with a spectrum band assignment for each pixel j=1 through L, where L=185. Each row 1004 represents spectral data for a single spectral channel for all of the spatial pixels i=1 through M.

The optical system geometry can distort the magnitude and direction of the spectral drift. The methods of the present invention, described herein, measure and correct the magnitude and direction of spectral drift for different spatial pixels 1 through M, representing columns 1002 of the 2-D array 1000, to correct for such distortion.

Implementation of the Present Invention

Figure 9:
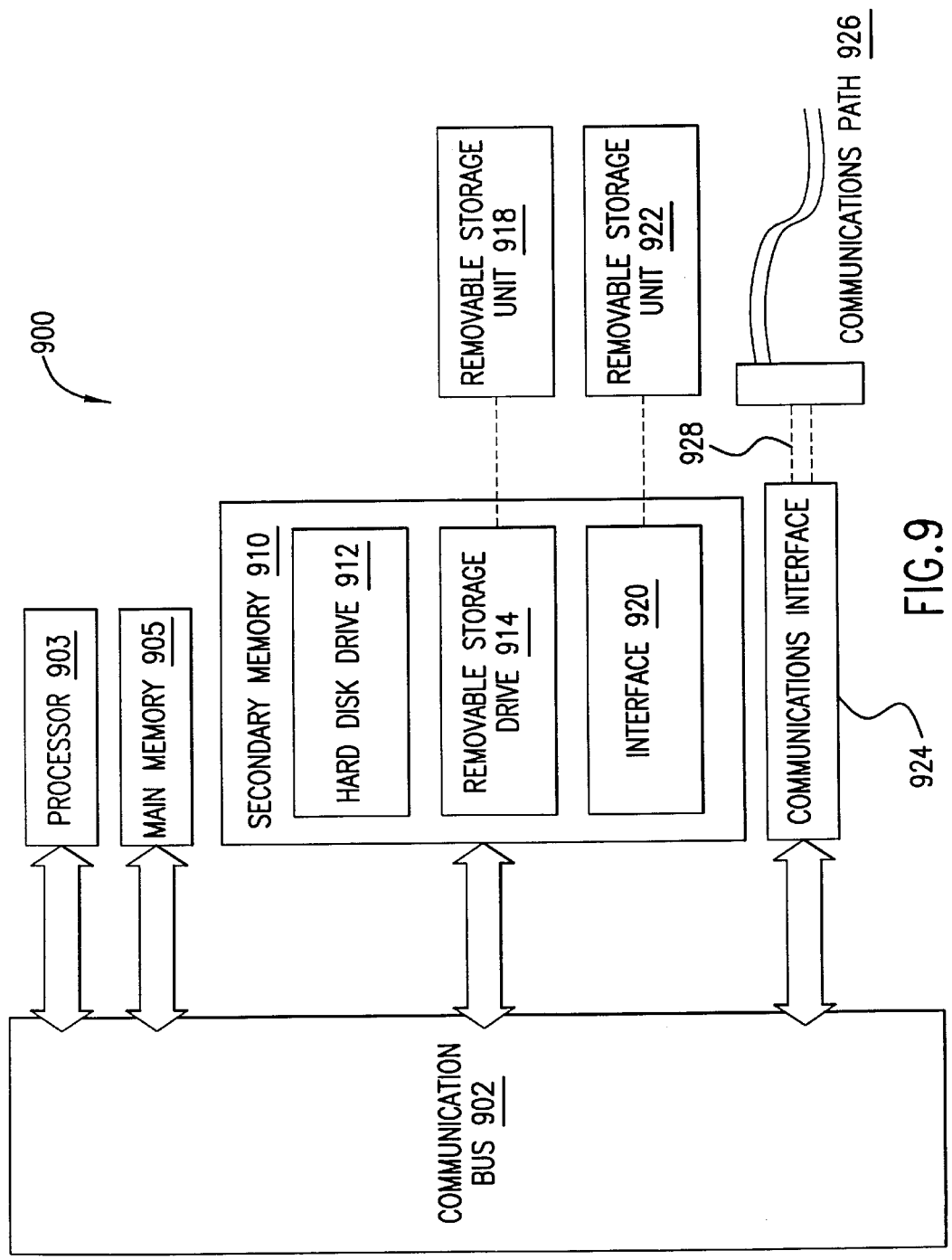
FIG. 9 is a diagram illustrating an exemplary computer system.

The present invention may be implemented using hardware, software, or a combination thereof and may be implemented in one or more computer systems or other processing systems. In fact, in one embodiment, the invention is directed toward one or more computer systems capable of carrying out the functionality described herein. An example implementation of a computer system 900 is shown in FIG. 9. Various embodiments are described in terms of this exemplary computer system 900. After reading this description, it will be apparent to a person skilled in the relevant art how to implement the invention using other computer systems and/or computer architectures. The computer system 900 includes one or more processors, such as processor 903. The processor 903 is connected to a communication bus 902.

Computer system 900 also includes a main memory 905, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a PCM-CIA slot and card, a wireless LAN (local area network) interface, etc. Software and data transferred via communications interface 924 are in the form of signals 928 which may be electronic, electromagnetic, optical, or other signals capable of being received by communications interface 924. These signals 928 are provided to communications interface 924 via a communications path (i.e., channel) 926. This channel 926 carries signals 928 and may be implemented using wire or cable, fiber optics, a phone line, a cellular phone link, a wireless link, and other communications channels.

In this document, the term "computer program product" refers to removable storage units 918, 922, and signals 928. These computer program products are means for providing software to computer system 900. The invention is directed to such computer program products.

Computer programs (also called computer control logic) are stored in main memory 905, and/or secondary memory 910 and/or in computer program products. Computer programs may also be received via communications interface 924. Such computer programs, when executed, enable the computer system 900 to perform the features of the present invention as discussed herein. In particular, the computer programs, when executed, enable the processor 903 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 903, causes the processor 903 to perform the functions of the invention as described herein.

In another embodiment, the invention is implemented primarily in hardware using, for example, hardware components such as application specific integrated circuits (ASICs). Implementation of hardware state machine(s) so as to perform the functions described herein will be apparent to persons skilled in the relevant art(s).

In yet another embodiment, the invention is implemented using a combination of both hardware and software.

Conclusion

While various embodiments of the present invention have been described above, it should be understood that they have been presented by way of example only, and not limitation. It will be understood by those skilled in the art that various changes in form and details maybe made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for detecting spectral drift in a hyperspectral imaging system, comprising the steps of:
    (a) obtaining in-field measurements of a response function for a calibration filter;
    (b) obtaining in-field measurements of a response function for an onboard blackbody;
    (c) determining a spectral transmittance function using said response functions from steps (a) and (b) for said calibration filter and said onboard blackbody;
    (d) determining a first derivative function of said spectral transmittance function;
    (e) separating said first derivative function into a plurality of spectral band regions, each of said spectral band regions having +/− N pixels on either side of a localized minima;
    (f) determining a pixel shift magnitude value for one of said plurality of spectral band regions; and
    (g) applying said pixel shift magnitude value to a look-up table to determine a magnitude and direction of said spectral drift for one of said plurality of spectral band regions.

2. The method of claim 1, wherein step (a) comprises the step of obtaining in field measurements of a response function of a calibration filter, wherein said calibration filter is sequentially irradiated by first and second blackbody sources, respectively, wherein said first and second blackbody sources are maintained at temperatures $t_1$ and $t_2$, respectively.

3. The method of claim 2, wherein step (a) further comprises the step of obtaining multiple frames of said response function of said calibration filter sequentially irradiated by said first blackbody source at temperature $t_1$ and said second blackbody source at temperature $t_2$.

4. The method of claim 1, wherein multiple frames of data are collected at equivalent frame times and ensemble averaged to obtain said response functions in steps (a) and (b).

5. The method of claim 4, wherein step (c) further comprises the step of removing background radiance from said ensemble averaged response functions to produce a spectral transmittance function.

6. The method of claim 1, wherein step (b) comprises the step of obtaining in-field measurements of said response function for said onboard blackbody at temperatures $t_1$ and $t_2$, respectively.

7. The method of claim 1, wherein step (c) further comprises the step of normalizing said first derivative function of said spectral transmittance function.

8. The method of claim 1, wherein said step of separating said first derivative function into a plurality of spectral band regions enables the implementation of a full sensitivity to spectral drift, wherein the value of N varies with each of said spectral band regions.

9. The method of claim 1, wherein step (e) comprises the step of determining a sum of the differences between said first derivative function and a reference spectral derivative function from a starting point pixel number to an ending point pixel number for one of said spectral band regions.

10. The method of claim 1, further comprising the steps of:
generating new spectral channel assignments for each pixel of said spectral band region using the spectral magnitude and direction of said spectral drift; and
interpolating values in between.

11. The method of claim 1, further comprising the step of introducing said calibration filter sequentially irradiated by first and second blackbody sources into an optical path of said hyperspectral imaging system using a flip mirror, prior to obtaining in-field measurements of said response function for said calibration filter.

12. The method of claim 5, wherein step (c) comprises the steps of:
determining a spectral difference function, wherein the spectral difference function is the difference between said response function at temperature $t_1$ and said response function at temperature $t_2$;
determining a blackbody difference function, wherein the blackbody difference function is the difference between said blackbody source at temperature $t_1$ and said blackbody source at temperature $t_2$; and
determining said spectral transmittance function, wherein said spectral transmittance function is the quotient of the spectral difference function and the blackbody difference function.

13. The method of claim 1, wherein the value of N is selected to optimize detection algorithm sensitivity to change while extending a limit of spectral shift magnitude.

14. The method of claim 1, wherein a spectral band per pixel for each spectral band region is defined by an optical geometry, a system focal length, a detector size, and a spectral dispersion rate design of said hyperspectral imaging system.

15. The method of claim 1, wherein the generation of said reference derivative function comprises the steps of:
(1) measuring multiple frames of a reference spectrum of said calibration filter sequentially irradiated by said first and second blackbody sources in a laboratory environment;
(2) measuring multiple frames of a reference spectrum of said first and second blackbody sources in a laboratory environment;
(3) ensemble averaging said reference spectrums from steps (1) and (2);
(4) removing background radiance from said ensemble averaged reference functions to produce a reference spectral transmittance function; and
(5) determining a first derivative of said reference spectral transmittance function.

16. The method of claim 15, wherein step (5) further comprises the step of normalizing said first derivative of said reference spectral transmittance function.

17. The method of claim 1, further comprising the step of generating said look-up table from said first derivative of said reference spectral transmittance function prior to performing step (g).

18. The method of claim 17, wherein said step of generating said lookup table comprises the steps of:
(1) shifting said first derivative of said reference spectral transmittance function by a predetermined shift value in a positive and a negative direction to generate a positive and negative shifted derivative function;
(2) determining the difference between said positive and negative shifted first derivative function and said first derivative of said reference spectral transmittance function to generate pixel shift magnitude values in said positive and negative direction, respectively;
(3) storing said pixel shift magnitude values and the corresponding predetermined shift value in said lookup table; and
(4) repeating steps (1) through (3) using anew predetermined shift value until said spectral band is covered.

19. The method of claim 18, further comprising the step of iteratively repeating steps (1) through (4) for a different spectral band until each of said spectral bands is covered.

20. A computer program product comprising a computer useable medium having computer program logic recorded thereon for enabling a computer to detect spectral drift in a hyperspectral imaging system, said computer program logic comprising:
means for enabling a processor to obtain in-field measurements of a response function for a calibration filter;
means for enabling a processor to obtain in-field measurements of a response function for an onboard blackbody;
means for enabling a processor to determine a spectral transmittance function using said response functions for said calibration filter and said onboard blackbody;
means for enabling a processor to determine a first derivative function of said spectral transmittance function;
means for enabling a processor to separate said first derivative function into a plurality of spectral band regions, each of said spectral band regions having +/− N pixels on either side of a localized minima;
means for enabling a processor to determine a pixel shift magnitude value for one of said plurality of spectral band regions; and
means for enabling a processor to apply said pixel shift magnitude value to a look-up table to determine a magnitude and direction of said spectral drift for one of said plurality of spectral band regions.

21. The computer program product of claim 20, wherein said means for enabling a processor to obtain in-field measurements of a response function for a calibration filter comprises means for enabling a processor to obtain in-field measurements of a response function for a calibration filter, wherein said calibration filter is sequentially irradiated by first and second blackbody sources, respectively, wherein said first and second blackbody sources are maintained at temperatures $t_1$ and $t_2$, respectively.

22. The computer program product of claim 20, wherein said means for enabling a processor to obtain in-field measurements of a response function for a calibration filter further comprises means for enabling a processor to obtain multiple frames of said response function of said calibration filter sequentially irradiated by said first blackbody source at temperature $t_1$ and said second blackbody source at temperature $t_2$.

23. The computer program product of claim 20, wherein multiple frames of data are collected at equivalent frame times and ensemble averaged to obtain said response functions for said calibration filter and said onboard blackbody.

24. The computer program product of claim 23, wherein said means for enabling a processor to determine said spectral transmittance function further comprises means for enabling a processor to remove background radiance from said ensemble averaged response functions to produce said spectral transmittance function.

25. The computer program product of claim 20, wherein said means for enabling a processor to obtain in-field measurements of said response function for said onboard blackbody comprises means for enabling a processor to obtain in-field measurements of said response function for said onboard blackbody at temperatures $t_1$ and $t_2$, respectively.

26. The computer program product of claim 20, wherein said means for enabling a processor to determine said spectral transmittance function further comprises means for enabling a processor to normalize said first derivative function of said spectral transmittance function.

27. The computer program product of claim 20, wherein said means for enabling a processor to separate said first derivative function into said plurality of spectral band regions enables the implementation of a full sensitivity to spectral drift, wherein the value of N varies with each of said spectral band regions.

28. The computer program product of claim 20, wherein said means for enabling a processor to separate said first derivative function into said plurality of spectral band regions comprises means for enabling a processor to determine a sum of the differences between said first derivative function and a reference spectral derivative function from a starting point pixel number to an ending point pixel number for one of said spectral band regions.

29. The computer program product of claim 20, wherein said control logic further comprises:
   means for enabling a processor to generate new spectral channel assignments for each pixel of said spectral band region using the spectral magnitude and direction of said spectral drift; and
   means for enabling a processor to interpolate values in between.

30. The computer program product of claim 20, wherein said control logic further comprises means for enabling a processor to introduce said calibration filter sequentially irradiated by first and second blackbody sources into an optical path of said hyperspectral imaging system using a flip mirror, prior to obtaining in-field measurements of said response function for said calibration filter.

31. The computer program product of claim 24, wherein said wherein said means for enabling a processor to determine said spectral transmittance function comprises:
   means for enabling a processor to determine a spectral difference function, wherein the spectral difference function is the difference between said response function at temperature $t_1$ and said response function at temperature $t_2$;
   means for enabling a processor to determine a blackbody difference function, wherein the blackbody difference function is the difference between said blackbody source at temperature $t_1$ and said blackbody source at temperature $t_2$; and
   means for enabling a processor to determine said spectral transmittance function, wherein said spectral transmittance function is the quotient of the spectral difference function and the blackbody difference function.

32. The computer program product of claim 20, wherein the value of N is selected to optimize detection algorithm sensitivity to change while extending a limit of spectral shift magnitude.

33. The computer program product of claim 20, wherein a spectral band per pixel for each spectral band region is defined by an optical geometry, a system focal length, a detector size, and a spectral dispersion rate design of said hyperspectral imaging system.

34. The computer program product of claim 20, wherein the generation of said reference derivative function comprises:
   means for enabling a processor to measure multiple frames of a reference spectrum of said calibration filter sequentially irradiated by said first and second blackbody sources in a laboratory environment;
   means for enabling a processor to measure multiple frames of a reference spectrum of said first and second blackbody sources in a laboratory environment;
   means for enabling a processor to ensemble average said reference spectrums from said calibration filter and said first and second blackbody sources;
   means for enabling a processor to remove background radiance from said ensemble averaged reference functions to produce a reference spectral transmittance function; and
   means for enabling a processor to determine a first derivative of said reference spectral transmittance function.

35. The computer program product of claim 34, wherein said means for enabling a processor to determine a first derivative of said reference spectral transmittance function further comprises means for enabling a processor to normalize said first derivative of said reference spectral transmittance function.

36. The computer program product of claim 20, wherein said control logic further comprises means for enabling a processor to generate said look-up table from said first derivative of said reference spectral transmittance function.

37. The computer program product of claim 36, wherein said means for enabling a processor to generate said look-up table comprises:
   shifting means for enabling a processor to shift said first derivative of said reference spectral transmittance function by a predetermined shift value in a positive and a negative direction to generate a positive and negative shifted derivative function;
   determining means for enabling a processor to determine the difference between said positive and negative shifted first derivative function and said first derivative of said reference spectral transmittance function to generate pixel shift magnitude values in said positive and negative direction, respectively;
   storing means for enabling a processor to store said pixel shift magnitude values and the corresponding predetermined shift value in said lookup table; and
   repeating means for enabling a processor to repeat said shifting means through said storing means using a new predetermined shift value until said spectral band is covered.

38. The computer program product of claim 37, wherein said control logic further comprises means for enabling a processor to iteratively repeat said shifting means through said repeating means for a different spectral band until each of said spectral bands is covered.

* * * * *